United States Patent [19]

Long et al.

[11] Patent Number: 5,429,548
[45] Date of Patent: Jul. 4, 1995

[54] MULTIPLE DRIVE PRESS ROLLER AND SLICER APPARATUS AND METHOD

[76] Inventors: John W. Long, 12203 Nicholas St., Omaha, Nebr. 68154; David L. Thiede, 14825 N. 72nd St., Omaha, Nebr. 68122

[21] Appl. No.: 293,661

[22] Filed: Aug. 22, 1994

[51] Int. Cl.$^6$ .............................................. A23B 5/16
[52] U.S. Cl. .................................................. 452/127
[58] Field of Search ........................ 452/125, 127, 171

[56] References Cited

U.S. PATENT DOCUMENTS

| | | | |
|---|---|---|---|
| 2,173,336 | 9/1939 | Lamere et al. | 452/127 |
| 3,733,997 | 5/1973 | Beasley | 452/127 |
| 3,789,456 | 2/1974 | Doerfer et al. | 452/171 |
| 4,534,548 | 8/1985 | Hanau | 452/127 |
| 5,090,939 | 2/1992 | Leblanc | 452/127 |
| 5,127,812 | 7/1992 | Koch et al. | 452/125 |

*Primary Examiner*—Willis Little
*Attorney, Agent, or Firm*—John A. Beehner

[57] ABSTRACT

An automatic feed mechanism upper conveyor for an automatic trimmer wherein a layer of material may be removed from a meat product. The automatic feed mechanism upper conveyor comprises: a conveyor frame, means for mounting the conveyor frame, first and second drive shafts mounted at each end of the frame and connected in tandem by a drive chain. A plurality of friction engagement wheels is mounted in spaced relation on each of the first and second drive shafts. The friction engagement wheels in cooperation with the feed means is operative to advance the meat product into trimming engagement with the trimming means and is operative to trim a layer of material from the meat product without pivoting the meat piece.

A method is also provided for placing a meat product to be trimmed on said feed means of an automatic skinning machine having a dual drive upper press roller, advancing said meat product on said feed means to said press roller means and said feed roller means, advancing said meat product in a substantially uniform direction with said press roller means, said feed means and said feed roller means past said trimming means, and discharging said trimmed meat product from said trimmer.

19 Claims, 8 Drawing Sheets

MULTIPLE DRIVE PRESS ROLLER AND SLICER APPARATUS AND METHOD

BACKGROUND OF THE INVENTION

1. Technical Field

The method and apparatus of this invention relate generally to an apparatus and method for automatically transporting a meat product for trimming an unwanted portion of material from the meat product. More specifically, it relates to an apparatus and method of automatically feeding a meat product to a meat trimmer for trimming portions from a meat product which is of an extended, non-uniform shaped products such as but not limited to jowls, bellys, fat backs, pork lions and the like. The invention is particularly adapted to accommodate slightly "bowed" products having a "bony consistency" and which are most effectively trimmed by slightly flattening the product prior to trimming.

Meat "muscle" or "products" as used herein are meant to refer broadly to beef, pork, poultry, fish and the like. Materials to be trimmed may be fat, membranes, skin, connective tissue, gristle, bone or the like.

Taste in meat and desired fat content vary from country to country. In the United States, consumers generally desire about a one-quarter inch fat layer around the meat "muscle". However, the meat muscle in its original form may have a much thicker layer than this. Consequently, a portion of the fat must be trimmed from the meat muscle.

Currently, extended, rounded meat products must usually be trimmed by hand or using automatic feed machines. Some automatic machines such as the Maja SBA420, VBA 500 and the like, are very efficient at automatically trimming muscles. However, they tend to pivot or skew more elongated muscles as they are pulled through the machine during the trimming process. Additionally, slightly "bowed" products are not effectively trimmed since a relatively small, tangential, portion of the product contacts the blade. Conversely, while quite accurate, trimming by hand creates the possibility of serious injury to the hands. Additionally, there is a very large reduction in efficiency due to the time required to perform the numerous hand strokes necessary. Consequently, it is highly desirable to automate the process of trimming, irregularly shaped and slightly "bowed" meat products.

When the meat product is bowed and/or of irregular shape, there is a tendency for the product to be pivoted or skewed out of alignment while being pulled through the machine. This usually results because the irregularities in the meat shape cause different parts of the meat piece to be engaged nonuniformly by the friction devices in the machine. Therefore, it is desirable to provide a guidance mechanism which will act throughout the entire longitudinal extent of the product preventing any lateral movement of the product. While it is not possible to "assign" specific meat cuts to specific press roller configurations, some general guidelines are possible. When the product has a "bony" consistency, some type of "fingered" wheel is most effective at griping the meat product. Thus, where it is desired to engage elongated, irregularly shaped bony products, a plurality of wheels, longitudinally spaced along the meat products length, is usually most effective. Similarly, where it is desired that the meat cut be slightly "flattened" when passing over the blade, longitudinally space roller sets may effectively provide such a flattening force. The present invention is a simple device which will accommodate these elongated irregularly shaped meat products and which adapted for quick installation on conventional, automatic skinning machines.

In addition to the trimming function, it is sometimes desired (or in certain cases required by the FDA and USDA) to slice open or even cut off a portion of the muscle prior to its being trimmed. This inventor has provided a simple means for accomplishing any required slicing at the same time as the trimming by incorporating a slicing blade as one of the press rollers.

The present invention is adapted for use on conventional automatic meat trimmers of the type described generally in our U.S. Pat. No. 5,236,323 which is herein incorporated by reference. Examples of such machines are the Maja GEA421, SBA420, and ESB441 and VBA 500 series machines. However, the present invention is not limited to these machines.

2. Description of the Prior Art

Prior art devices for automatically trimming unwanted portions from meat products are well known in the art. However, these devices are generally limited to meat products which are generally smaller or rounded. When such a machine is utilized with elongated or "bowed" meat pieces, it can have the undesirable characteristic of pivoting, skewing, or only tangentially trimming the product as it passes over the trimming blade. Consequently, some residual or "touch-up" trimming must be accomplished by hand with its concomitant problems, such as inefficiency and injuries. Additionally, mistrimming of the meat can lead to "bare" spots where excess fat has been trimmed. Thus even if the possibility of injury were eliminated, the inefficiency of hand trimming would remain.

Automatic machines have been developed having elongated upper feed mechanisms such as conveyors or paddles for trimming of longer meant pieces. However, these machines are not particularly well suited for certain "bony" meat muscles. Meat muscles such as short loins may present a single contact point for an upper feed mechanism. Furthermore this point if "bony" is relatively frictionless to a flat surface such as a conveyor belt. Consequently, a means is needed to generate a greater frictional engagement with the meat product. A means this inventor has found to be very effective, is a plurality of wheels having gingers projectly therefrom, the invention is also capable of providing a simple and automatic slicing of the meat product during trimming.

Consequently, there is a great need for an apparatus which is capable of automatically skinning and slicing these elongated, "bowed" and/or irregularly shaped meat products.

Therefore, an object of the present invention is to provide an apparatus and method of efficiently transporting a meat product into an automatic trimmer and safely and automatically removing unwanted material such as fat, membranes and the like from elongated, bowed and/or irregularly shaped meat products such products might include, but not limited to, jowls, bellies, fatbacks, pork loins, "flat" beef or the like.

Another objective is to provide an apparatus which is capable of slicing a meat product at a desired location automatically during the trimming process.

Another object of the present invention is to provide an upper conveyor apparatus which is capable of transporting and trimming a variety of different sizes of meat products.

Another objective is to provide an apparatus capable of substantially "flattening" a meat piece during the trimming thereof.

Another object is to provide an apparatus capable of automatically feeding a variety of meat product types such as beef, pork, fish and other muscles into an automatic trimming apparatus.

Another object of the present invention is to provide a feed mechanism capable of keeping the meat product in proper position during the trimming process.

Still another object of the present invention is to provide an apparatus which is capable of conveying meat products of a variety of temperatures and consistencies, especially bony consistencies.

Finally, an object of the present invention is to provide an apparatus which is capable of automatic position adjustment to accommodate meat products of irregular shape.

SUMMARY OF THE INVENTION

The present invention is directed to a method and apparatus for automatically conveying a variety of elongated, "bowed" and/or irregularly shaped products into trimming position on an automatic trimmer and maintaining the product in correct trimming position. Such meat products may consist of a variety beef, pork, poultry, fish, muscles and the like and unwanted material may be any variety of fat, membranes, skins, connective tissue, gristle, bone and the like. The present apparatus is especially well suited to use with "bowed" and/or "bony" meat muscles and may also be used to slice the meat during trimming operations.

The invention thus provides a great advantage over the prior art meat conveyors by allowing these elongated, "bowed" and/or irregular portions of meat products to be automatically trimmed and/or sliced without the undesirable "twisting" or skewing effect and tangent trimming, which can result from prior art conveyor/positioning systems. Therefore, the irregular shaped meat products may be efficiently trimmed. Additionally, the process is greatly speeded up since the number of residual or "touch-up" manual trimming strokes which must be accomplished to achieve proper trimming is greatly reduced or even completely eliminated.

DESCRIPTION OF THE PREFERRED EMBODIMENT

In the meat trimming industry, a variety of meat types are encountered which must be trimmed prior to sale to consumers. Additionally some applications require a portion of the meat (such as an end portion) be completely cut off. Still other situations require that portions of the product be sliced open (such as mandated by the Food and Drug Administration in connection with hog jowls). In order to automate the trimming and slicing process to the greatest degree possible, the automatic skinning machine must be capable of accommodating this great variety of meat types and the amount of material to be trimmed therefrom. These meat types have a great variety of shapes and consistencies making an accommodation of as wide a range of these varieties as possible a difficult task. A rigid assignment of meat types to feed mechanisms is not possible as this use of these machines involves a certain degree of intuition on the part of the operator. Therefore, while it is not possible to provide an exact list of products suitable for each type of feed mechanism, some guidelines are possible. Consequently, to at least some degree, the products which may be accommodated by one configuration of press roller set assembly may also be adequately accommodated by quite different alternate configurations.

This inventor's solution to this problem is to provide a machine which is capable of utilizing a multiple axes press roller system. By using multiple driven press roller axis, the inventor has produced a machine which is able to provide a longitudinal stability to the meat product as it passes through the machine having the unwanted material trimmed therefrom. Additionally, this inventor has produced a machine which may utilize as one of the press roller axes, a slicing blade for slicing the meat as it passes through the machine. Still further, the use of multiple press roller sets allows the meat product to be "flattened" during the trimming process so that the meat product contacts the trimming blade substantially throughout its width.

In order to accommodate as wide a variety of meat product shapes as possible, the inventor has devised a machine which is capable of utilizing a wide variety of press roller configurations, each of which is particularly suited for a group of meat products. As is shown in the figures and described in detail below, the inventor's automatic skinning machine provides a high degree of automation and efficiency to the trimming and slicing processes thereby eliminating the inefficiencies and danger factor inherent with a human operator while at the same time providing a machine which is able to handle the vast majority of meat products for human consumption. Examples of meat products for which the present invention is well suited are jowls, bellies, pork loins, "flat" beef, fat backs and the like. However, many other types may be accommodated.

Figure 1:
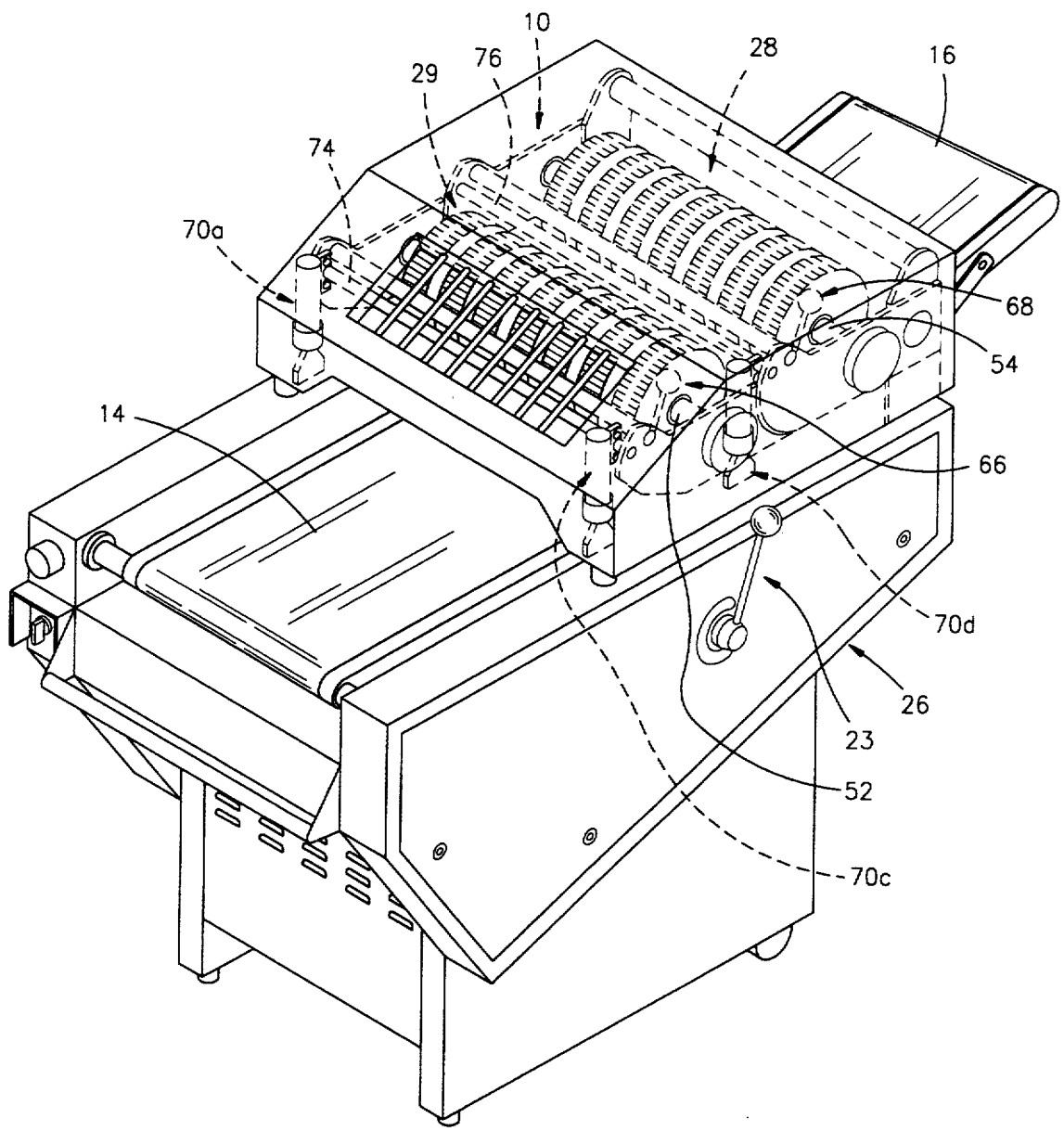
FIG. 1 is a perspective view of the upper conveyor assembly shown in dotted lines installed on an automatic trimming machine.

The overall operational configuration of the automatic skinning machine and its upper press roller apparatus 10 is best shown in FIG. 1. As shown in the figure, the upper press roller apparatus 10 is mounted atop a base frame 26. Base frame 26 comprises a input feed means 14. In the preferred embodiment, input feed means 14 is a conveyor belt assembly which is operative to transport the meat product 36 (not shown) into frictional engagement with the first set of press rollers 29. If the machine is to function in only the trimming mode, the design and construction of first press rollers 29 are such that they fictionally engage the meat product 36 (not shown) transported by feed means 14. The rotation of press rollers 29 in cooperation with the rotation of feed means 14 is operative to meat product 36 (not shown) into frictional engagement with second press roller set 28. Press rollers 28 are also constructed of a size and design that they fictionally engage meat product 36 (not shown) in the preferred method of operation, the meat product 36 (not shown) is of such a length so as to be engaged simultaneously by rollers 28 and 29 during a portion of its travel through the skinning machine.

As mentioned above, in order to maximize the utility of the automatic skinning machine, the machine must accommodate as wide a variety of meat product sizes and consistencies as possible. This inventor has accomplished this by providing a variety of press roller configurations to use in individual situations. While a rigid assignment of meat product types to roller configurations is not possible, some configurations work better with some meat product types. One such preferred configuration is shown in FIG. 1.

Figure 3:
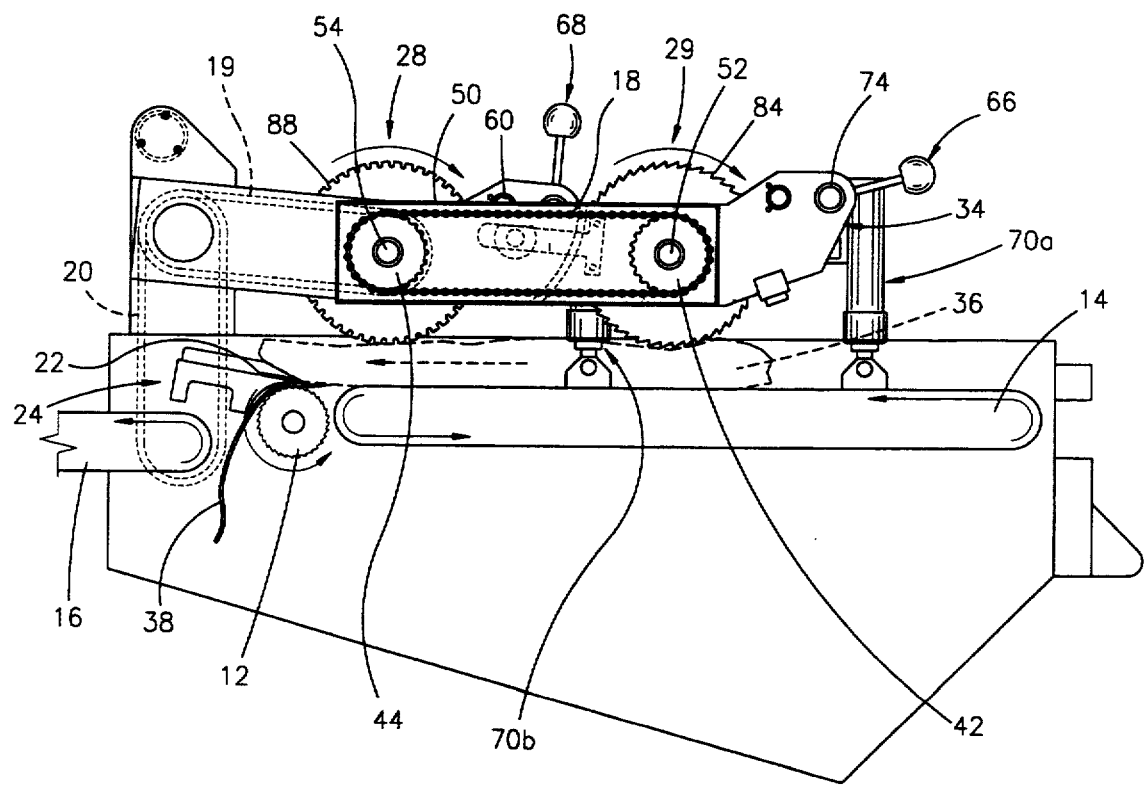
FIG. 3 is a is an opposite side of the embodiment of FIG. 2 showing especially the tandem drive mechanism.
Figure 10:
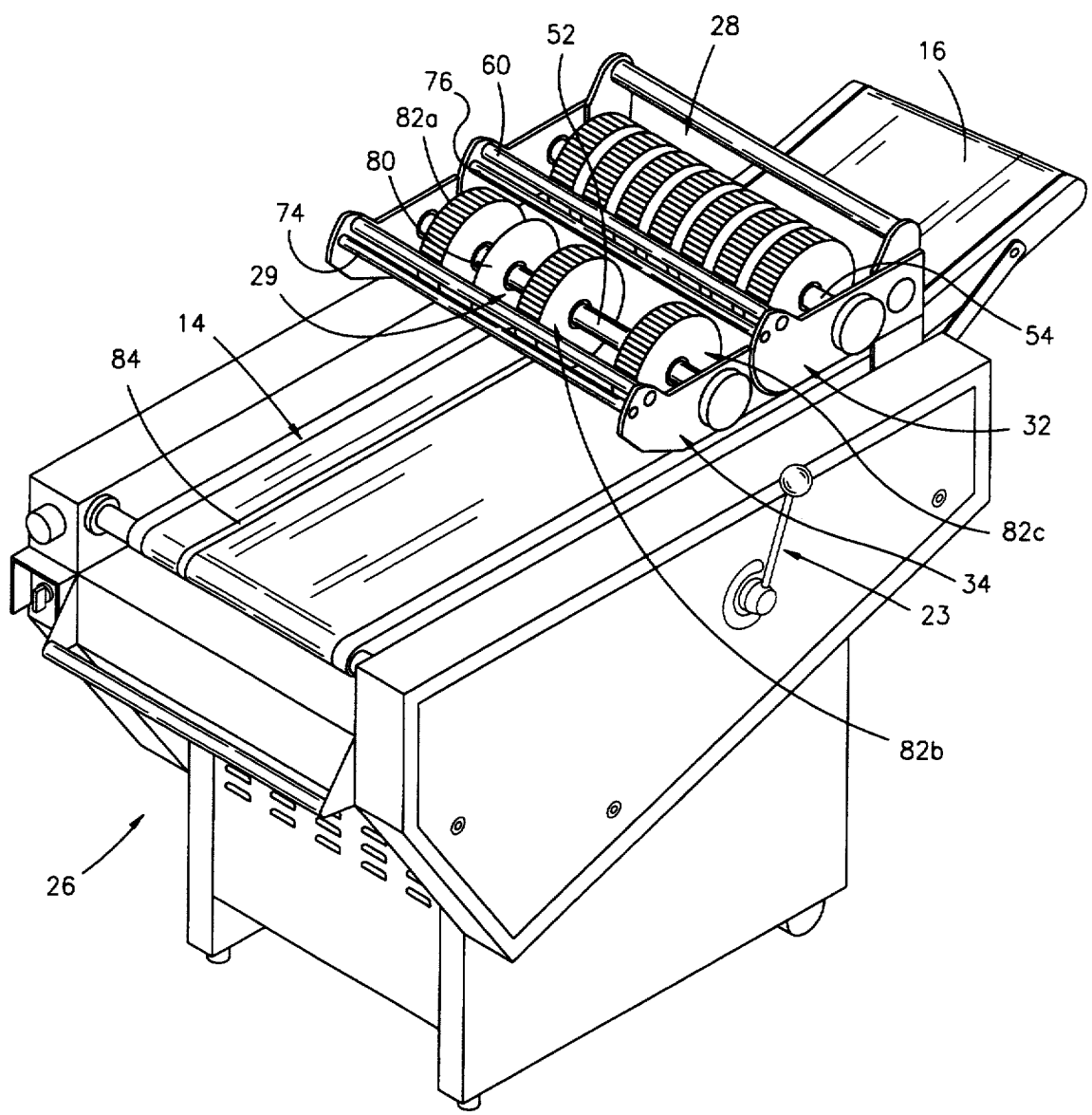
FIG. 10 is a front perspective view of an alternative embodiment where press rollers on the front axis comprise both a cutting blade as well as a plurality of friction wheels.

In the configuration of FIG. 1, the press roller sets comprise a plurality of uniform diameter wheels having a plurality of resilient fingers projecting therefrom. The plurality of wheels are mounted on two independent mounting shafts and comprise first press roller set 29 and second press roller set 28. The press roller mounted axis are positioned orthogonal to the directional movement of the meat product 36 (not shown) through the machine. The two wheel mounting axis are driven in tandem by means of a drive chain 18 (FIG. 3). The orientation and rotation of the wheels is such that the wheel fingers engage the meat product as it is transported by feed means 14 and is urged further along in its movement through the machine. If the machine is to be utilized for slicing of the meat product in addition to trimming, first press roller set 29 would comprise at least one slicing blade 80 (FIG. 10). This embodiment is discussed below in connection with FIG. 10.

First and second wheel shafts 52 and 54 respectively are mounted in carriage 30 vertically above the feed means 14. Carriage 30 is divided into two pivotally connected halves, 32 and 34. Vertical separation of carriage 30, and consequently first and second shafts 52 and 54 from feed means, is determined by spring cylinders 70 a–d (FIGS. 2-5). Each of spring cylinders 70 a–d are independently mounted such that the carriage forward section 34 and rear section 32 and consequently first and second wheel shafts 52 and 54 are able to move independently so that they may move in conformity with of the meat product being trimmed.

The upper press roller apparatus of the present invention is adapted to be mounted on any of a variety of automatic skinning machines such as the Maja GE421, SBA420, ESB441 or VBA 500 series machines as shown in the figure. However, the upper press roller apparatus of the present invention is not in any way limited to use with these specific machines.

Figure 2:
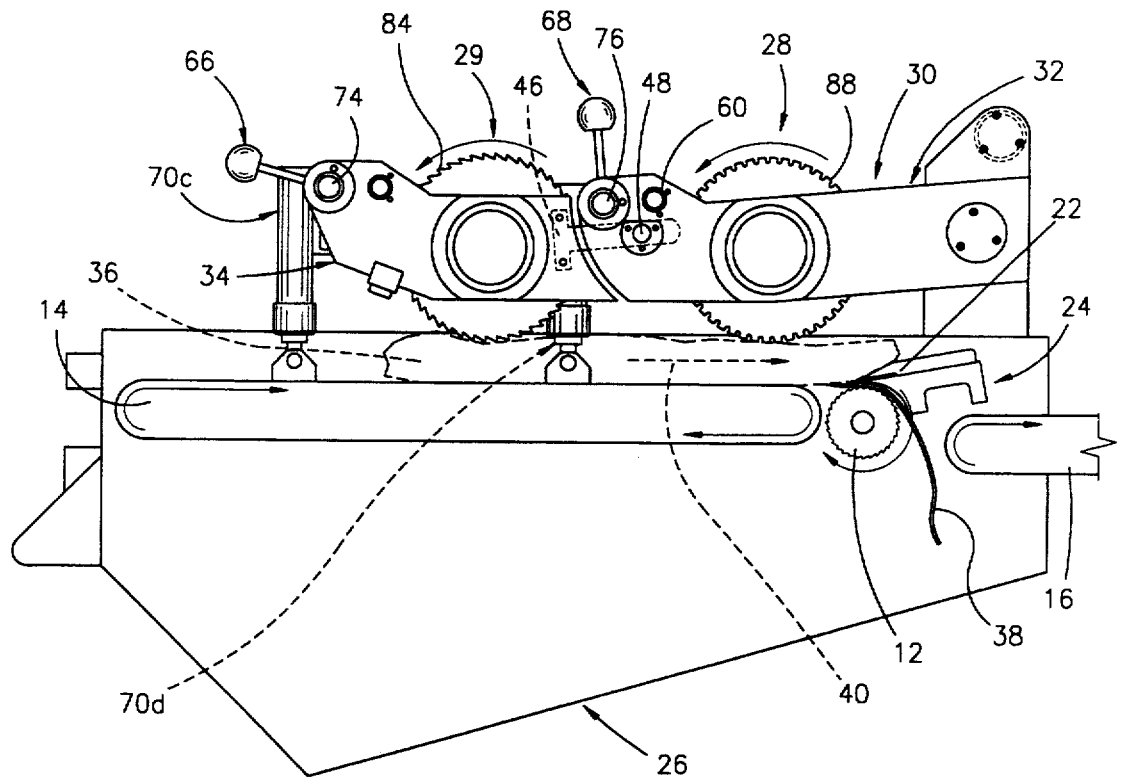
FIG. 2 is a side view of an embodiment of the upper conveyor apparatus of the present invention.

FIGS. 2 and 3 show opposite side views of the upper press roller apparatus 10 installed on a conventional automatic skinning machine and configured for the trimming mode of operation. As seen in the figures, the apparatus comprises two independent wheel shafts 52 and 54. Front press roller set 29 is mounted on first wheel shaft 52 and rear press roller set 28 is mounted on second shaft 54. Shafts 52 and 54 are driven in tandem by means of drive chain 18 connected therebetween. Driving of shafts 52 and 54 is provided by drive chain 19 and 20 connected to the main drive mechanism (not shown) of the automatic skinning machine. This tandem drive feature provided by chain 18, facilitates the movement of the meat product through the machine by providing two separate press roller sets which are capable of engaging and propelling the meat through the machine. Alternatively, when the machine is also utilized in the slicing mode, chain 18 drives the slicing blades 84 secured to shaft 52.

Also shown in the figures are the four independent spring cylinders 70 a–d. As mentioned above, the independent movement of spring cylinder 70 a–d provide a means for the upper carriage press roller sets 28 and 29 to move independently in a vertical direction, thereby allowing a meat piece 36 of nonuniform thickness to be effectively gripped by the press rollers 28 and 29 and move through the automatic skinner.

Also shown in these figures are the elongated meat products 36, for which the inventor's skinning machine is particularly effective at handling. As shown in the figure, the longitudinal extent of the meat product 36 causes it to be in simultaneous contact with both sets of press rollers 28 and 29 during the majority of its travel through the skinning machine. Additionally, due to the weight of carriage 30 and the action of spring cylinders 70a–d, the meat product 36 is maintained in a relatively "flat" orientation as it passes over trimming means 22. Thus, material 38 is trimmed substantially throughout the width of product 36. Also shown is the meat product 36 in trimming engagement with trimming means 22. Trimming means 22 in the preferred embodiment is a sharp blade held by means of blade holder 24 and in such an orientation that it bites into the lower portion of the meat product as shown in the figure. Passing the meat product 36 over the trimming means 22 is therefore operative to trim a portion from the meat product 36 equal to the bite of the blade. Operation of the trimming means 22 on the meat product 36 and the gripping action of feed roller 12 are more completely described in our earlier U.S. Pat. No. 5,236,323 which is herein incorporated by reference.

Feed roller 12 comprises a plurality of gripping teeth which are operative to grip the trimmed material 38 as shown in the figure. Due to the rotation of the feed roller means in cooperation with the feed means 14 and press roller sets 28 and 29, the meat product 36 is carried through the machine as shown by the direction arrow 40 in the figure. As meat product 36 is propelled through the skinning machine, the trimming means 22 engages the lower portion of the meat product throughout its length thus trimming material 38 from the underside of the product 36. Also shown in the figures are the locking levers 66 and 68. Locking levers 66 and 68 are operative to lock the carriage forward and rearward sections 34 and 32 respectively in mating engagement with spring cylinders 70 a-d. Thus, locking lever 66 and 68 provide a means for releasing carriage 30 from spring cylinder 70 a-d, mounted to frame 26, thereby permitting carriage 30 to be pivoted upward for any general maintenance activities.

FIG. 3 is an opposite side view of the upper press roller apparatus 10 of the present invention. The additional features or attributes of the invention shown in this figure are the drive mechanism for the press roller apparatus. As shown clearly in the figure, the press roller sets 28 and 29 are driven in tandem by means of drive chain 18. Each of the press roller sets 28 and 29 are mounted on independent shafts 54 and 52 respectively. Additionally, secured to the end of shafts 54 and 52 are geared sprockets 44 and 42 respectively. Geared sprockets 44 and 42 are in turn connected by means of drive chain 18 thereby providing a means for driving shafts 54 and 52 and associated press roller sets 28 and 29 in tandem. Second shaft 54 is in turn driven by the main driving motor of the skinning machine (not shown) through drive chains 19 and 20. A more detailed explanation of the skinning machine motor system is provided in our U.S. Pat. No. 5,236,323.

Figure 4:
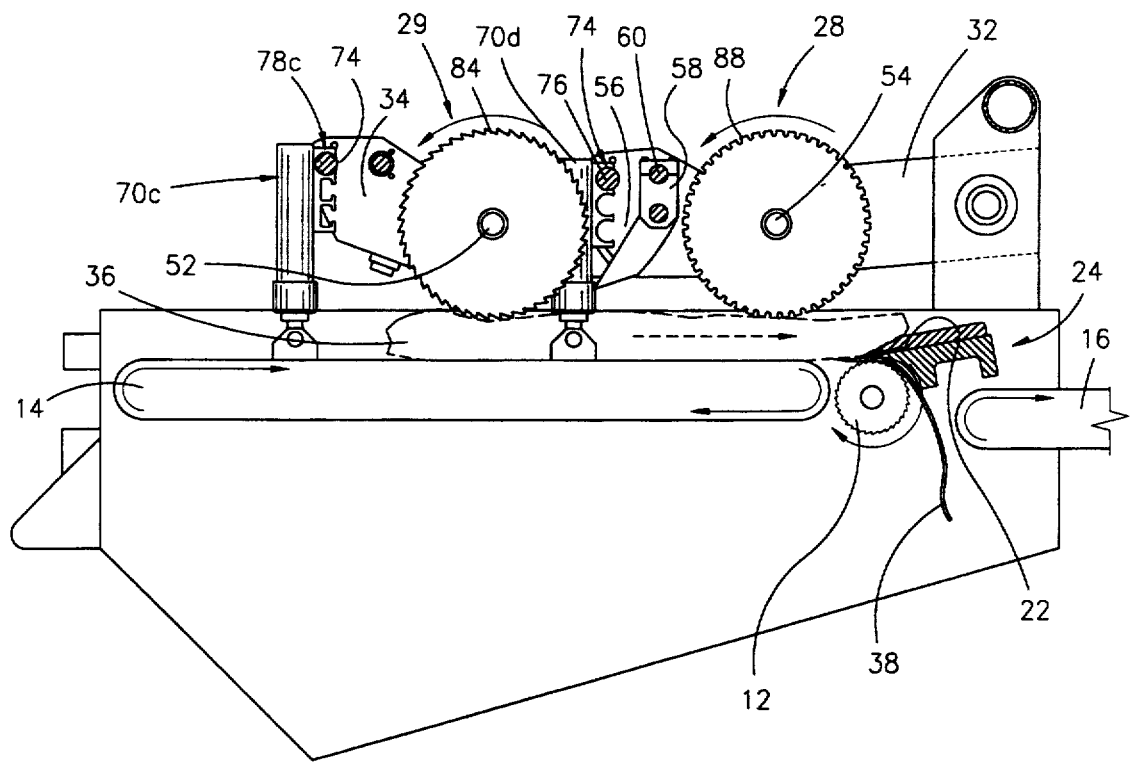
FIG. 4 is a cut away side view of an alterative embodiment of the present invention showing in particular the interconnection of the shock absorbers and connections.
Figure 5:
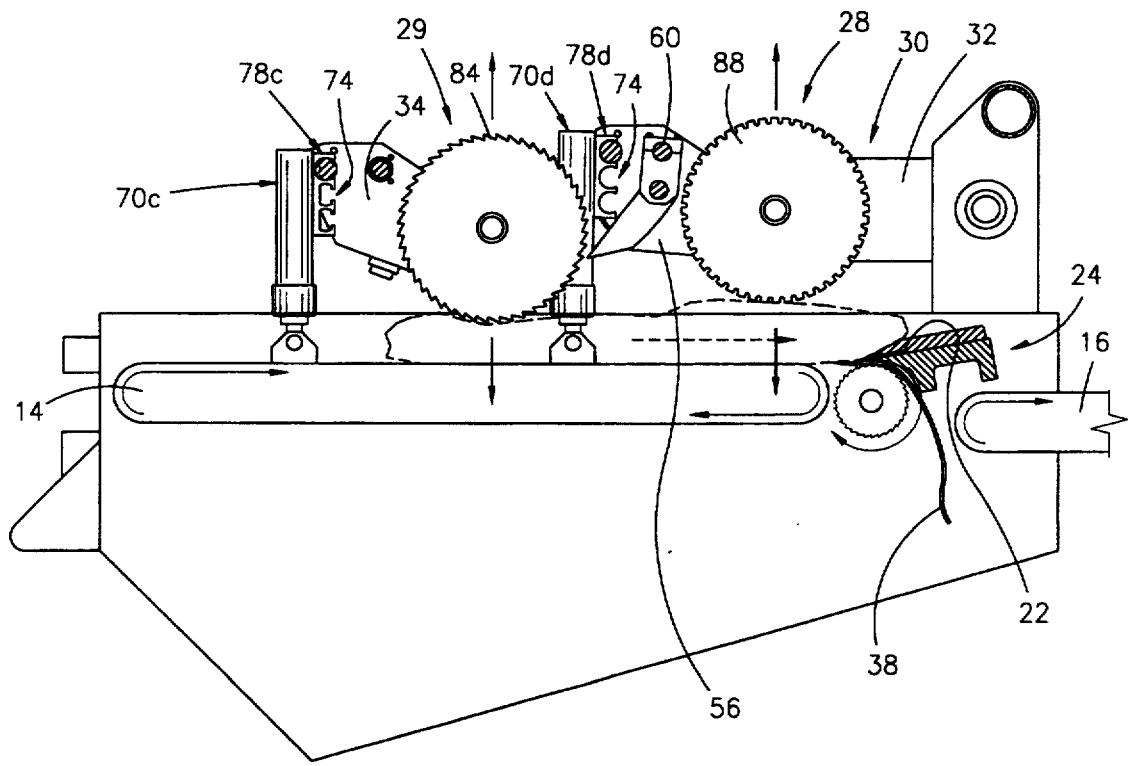
FIG. 5 is an opposite side view of the embodiment at FIG. 4 showing independent movement of the press rollers.

FIGS. 4 and 5 are additional side views of the upper press roller apparatus showing in detail the inner connection of the carriage 30 with the spring cylinder 70 a-d. In particular, FIG. 4 shows the rotational movement of press roller sets 28 and 29 in relation to the movement of the meat product 36 through the skinner machine. FIG. 5 demonstrates the independent vertical movement of the press roller sets described earlier, facilitated by the independent suspension of spring cylinders 70 a-d. Carriage 30 comprises rear section 32 and forward section 34 joined by means of mounting bracket 46 shown in dotted lines in FIGS. 2 and 3. Mounting bracket 46 is secured to carriage forward section 34 and is pivotally connected to shaft 48 which is in turn secured to carriage rear section 32. Thus forward section 34 and rear section 32 are capable of independent vertical movement relative to frame 26 and meat product 36 thereby enabling roller sets 28 and 29 to move in conformity with the shape of the meat product 36 transported through the skinning machine. In some applications, it may be desirable to provide a means for preventing the meat product from being gripped by the rollers and lifted upward from the feed means 14. In such a situation, it is possible to provide fingers 56 which will prevent the meat product from rotating upwards and away from the feed means 14. Such fingers 56 may be mounted to the upper press roller apparatus by means of bracket 58. Auxiliary mounting shaft 60 is provided for mounting of such auxiliary pieces as fingers 56 between roller sets 29 and 28. Also shown in the two figures is the locking mechanism for locking each of the front and rear carriage sections to their respective spring cylinders. Each cylinder 70 a-d has a respective connection arm 78 a-d which comprises a plurality of slots therein for reception of locking shaft 74 or shaft 76. Once locking shaft 74 or 76 are received within receiving slots, the locking lever 66 or 68 is rotated approximately ninety degrees, thereby locking shaft 74 or 76 into position and securing cylinders 70 a-d to carriage 32 or 34. The spring cylinder 70 a-d and associated locking mechanisms are very similar to those associated with conventional automatic skinning machines such as the Maja GEA421, SBA420, ESB441 and VBA 500 series machines.

Figure 6:
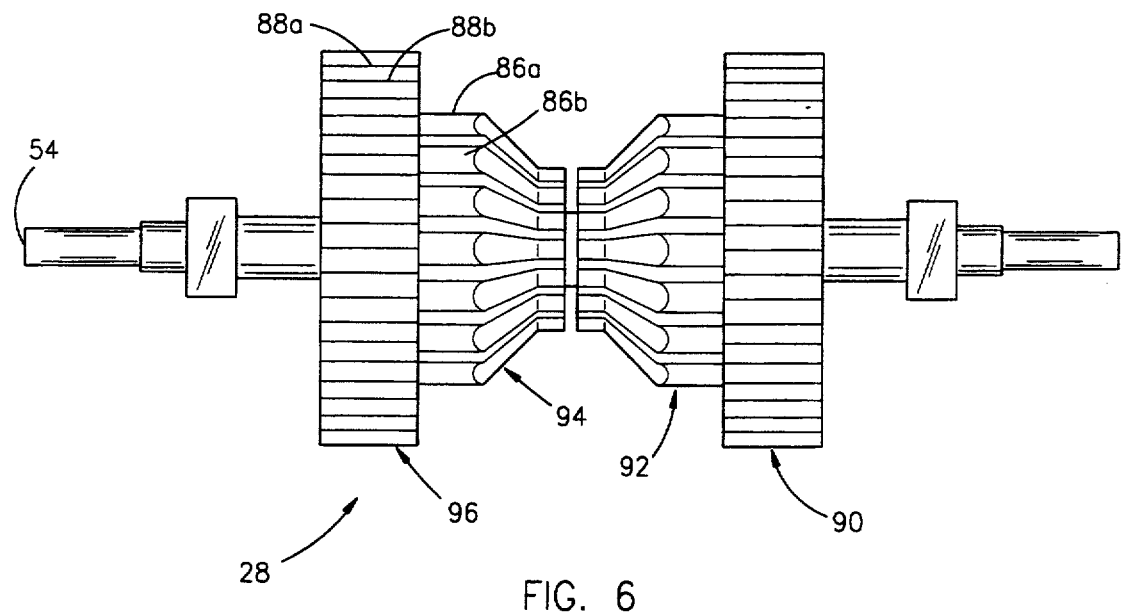
FIG. 6 is a front view showing one alternative embodiment of press rollers.
Figure 7:
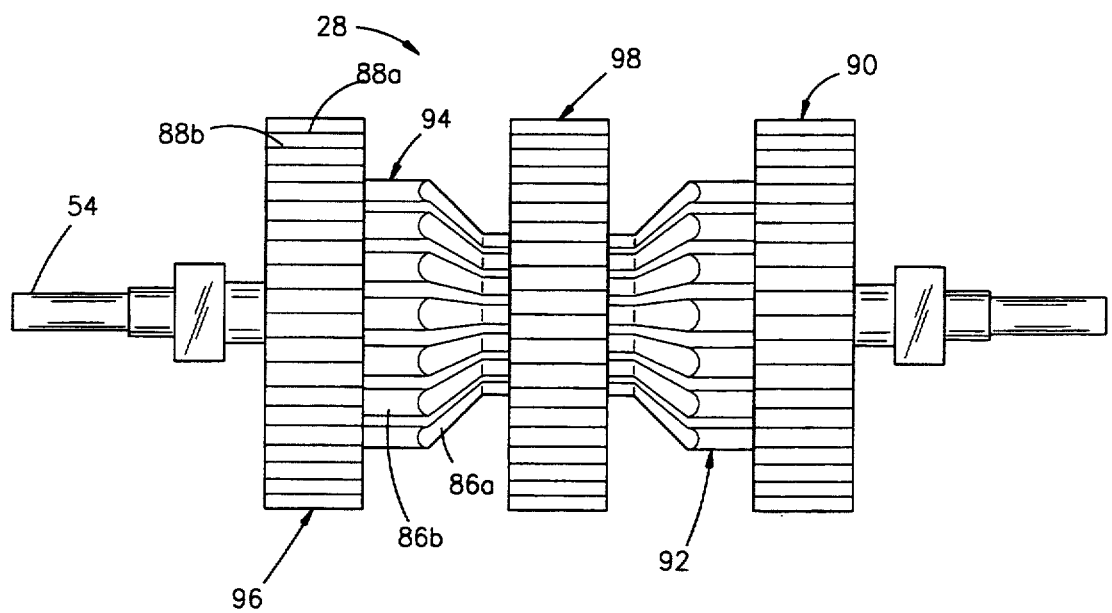
FIG. 7 is a front view showing another alternative embodiment for the press rollers.

FIGS. 6 and 7 show just two of the large variety of friction wheat configurations which may be used as the press roller sets 28 and 29. As stated above, the upper press roller apparatus of the present machine will accommodate a great variety of press roller configurations. The individual configuration being dictated by the individual users preference and the particular meat product type which is being trimmed and whether slicing is required. Therefore, while no strict assignment of one type of press roller configuration to a particular meat type is correct, some general guidelines are possible. For example, the wheel configuration of FIG. 6 might be preferred when the meat product to be trimmed is a butt. Conversely, the wheel configuration of FIG. 7 might be preferred when the meat product to be trimmed is a loin. Alternatively, the configuration of FIG. 10 might be used if slicing is also required.

Although only one press roller set 28 is shown in FIGS. 6 and 7, it is understood that the apparatus would ordinarily also comprise a press roller set 29 shown in the earlier figures. As mentioned, press roller sets 28 and 29 may have similar or dissimilar configurations depending on the particular application. The press roller set 28 (or 29) may be constructed using a single, integral piece or they may be separate pieces. If and how the pieces are joined are unimportant as long as the individual wheels and/or blades comprising the press roller set 28 or 29 rotates with its shaft. In the preferred embodiment the wheels 90-98 are constructed of a hard plastic material. However, the construction material is not so important as that the wheel comprise projections (86-88) operative to engage the meat product (FIGS. 2-5).

Figure 8:
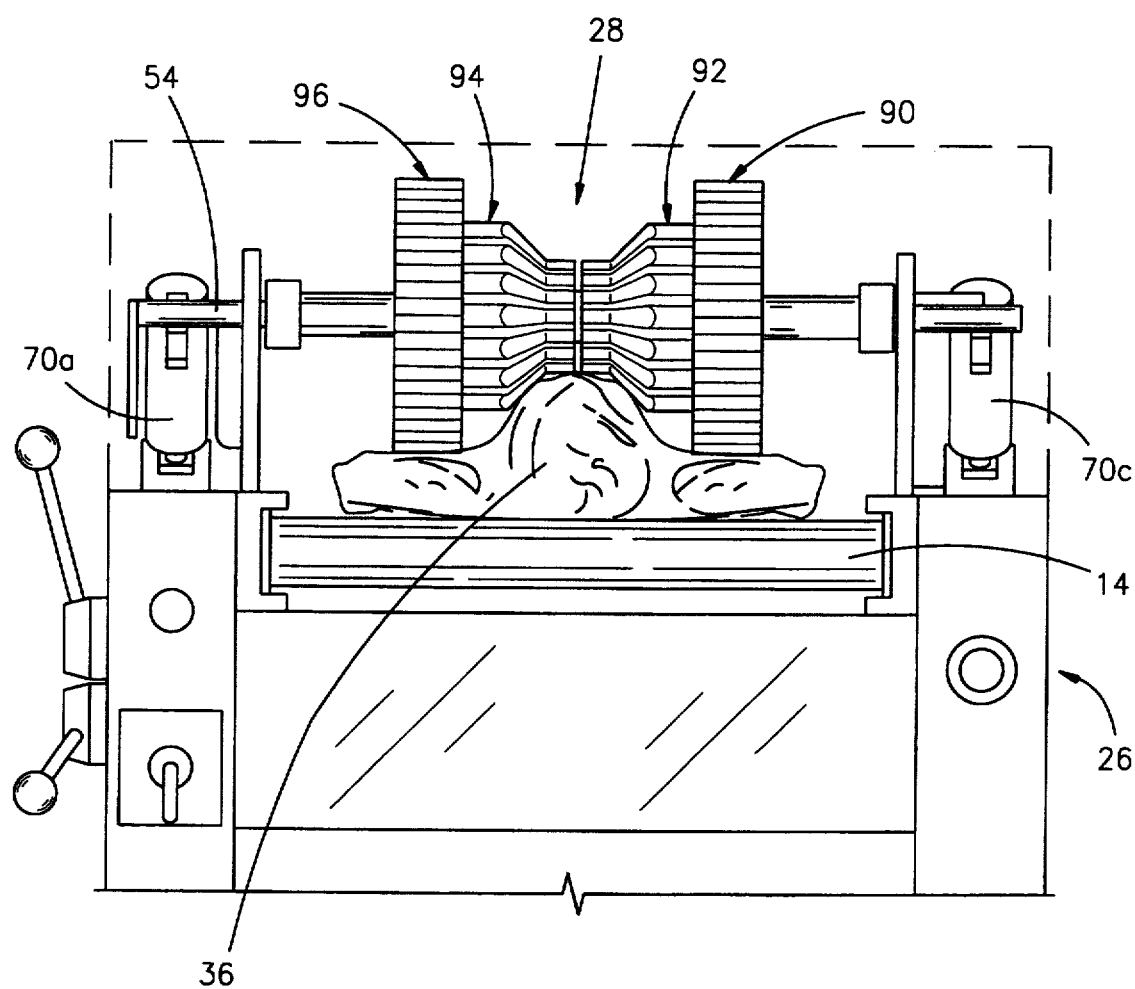
FIG. 8 is a front view showing a single set of the press rollers of FIG. 6 installed on an automatic trimming machine.
Figure 9:
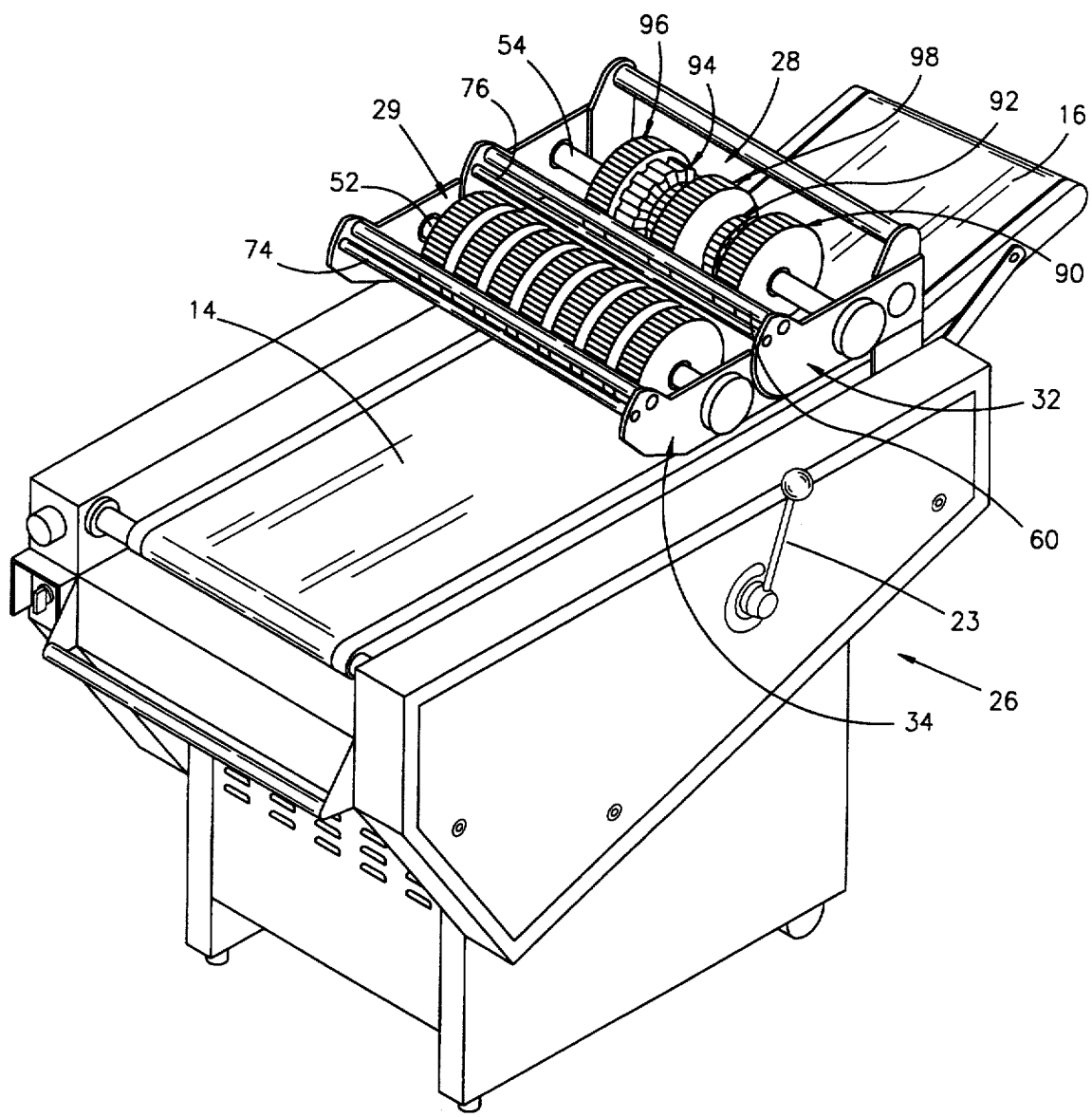
FIG. 9 is a front perspective view showing the friction wheels of the conveyor assembly.

FIG. 8 shows a single press roller set utilizing the roller configuration of FIG. 6. As shown in the figure, the particular wheel configuration is chosen to accommodate the particular meat type which is to be trimmed. In the preferred embodiment, the front and rear press roller sets 29 and 28 respectively may be of the same press roller configurations as seen in FIG. 10 or may be different configurations as seen in FIGS. 9 and 10. Again, the particular selection depends on the individual preferences of the operator and the meat selection to be trimmed.

FIG. 9 is a front perspective view showing installation of both the front and rear press roller sets 29 and 28. As shown in this figure, the rear press roller set 28 is the press roller configuration shown in FIG. 7 whereas the front press roller set 29 comprises a series of uniform diameter wheels.

FIG. 10 shows yet another important alternative embodiment of the present invention wherein the upper press roller apparatus performs an additional function of slicing the meat product prior to trimming. As mentioned above, some applications require that the meat be at least partially sliced open during the trimming process. The embodiment of FIG. 10 performs this function. In this configuration, the front press roller set 29 comprises both a cutting wheel 80 as well as a plurality of uniform diameter press wheels 82 a-c. The particular embodiment shown in FIG. 10 might be used to remove the lower section of a belly prior to trimming the remainder of the meat product. Other embodiments such as where all press wheels on the front press roller set 29 have been replaced by slicing blades such as blade 80 in FIG. 10 could be used for slicing open the jowls of a hog.

Several meat product types require special processing by the Food and Drug Administration (FDA) in order to determine the fitness for human consumption of the particular meat product. For example, the jowls of a hog must be sliced open at specific intervals to examine them for cancerous or other growths which would render the meat unfit for human consumption. Therefore, one additional embodiment would be to replace the press wheels 82 a-c of front roller set 29 with a plurality of blades such as 80 in FIG. 10. For this particular application of the machine, the slicing blades would be spaced at approximately one inch intervals. Also, the height of the front carriage section 34 can be adjusted using the spring cylinder locking mechanisms described above so that the slicing done by blade 80 is either a partial cut or sliced all the way through as shown in FIG. 10. Obviously, in this configuration, an allowance must be made in the conveyor feed means 14 to allow for the projection of the slicing blade 80 below the top level of the feed means 14. As shown in the figure, this allowance may take the form of a gap 84 in the feed means 14.

Figure 11:
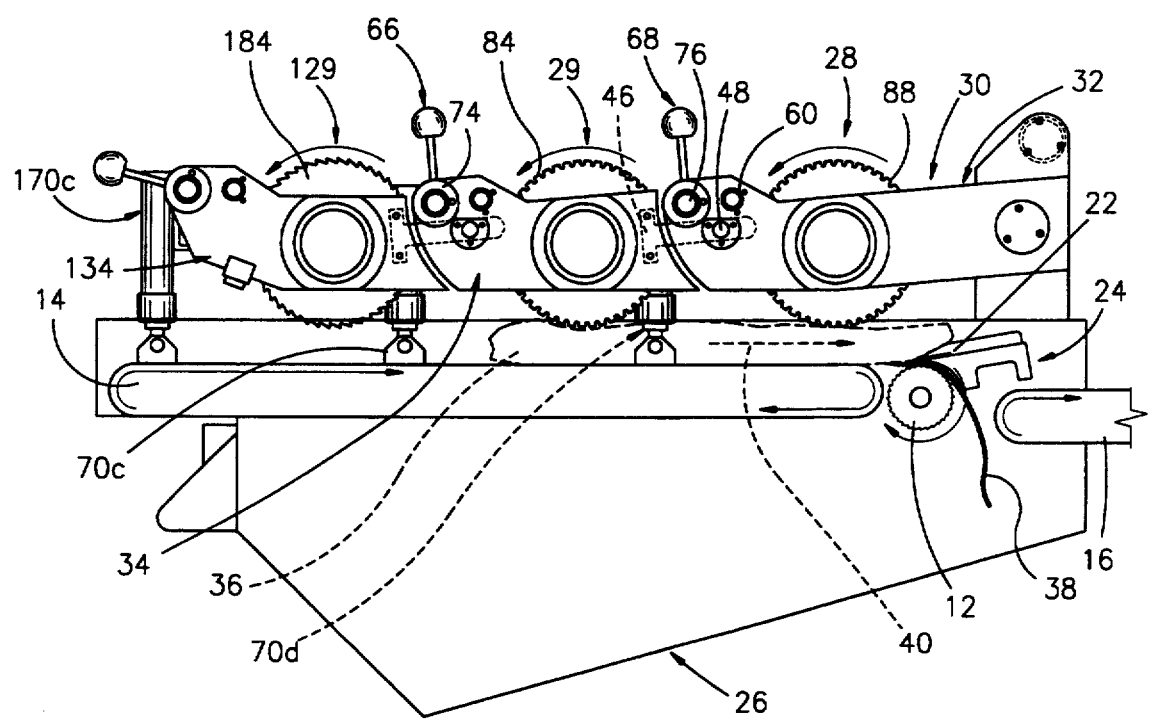
FIG. 11 is a side view showing an alternative embodiment wherein the upper conveyor assembly comprises three press roller sets.

FIG. 11 is a side view of yet another embodiment wherein three press roller sets 28, 29, and 129 are utilized. The carriage assembly 30 is then comprised of three pivotally connected sections 32, 34 and 134. The above discussion of the operation of the press roller sets and associated hardware, and the multitude of roller set configurations possible, apply equally to the embodiment of FIG. 11. The embodiment of FIG. 11 is particularly well suited for situations where longer meat products are to be trimmed and/or sliced.

It is obvious that numerous other modifications and variations of the present invention are possible in view of the above teachings. For example, an important modification previously mentioned is the use of various roller set combinations and construction material types to accommodate various meat product consistencies and sizes. Several roller set configurations were discussed above but additional alternatives will be apparent to those skilled in the art. Another modification is the number and spacing of slicing blades. Another modification would be to incorporate an adjustment means for adjusting the tension and initial positioning of the spring cylinders to further accommodate different meat types. Such an adjustment means might be manual or automatic. A further important modification is the different press roller set configurations, shapes, sizes, and constructions which can be utilized to accommodate the particular application requirements. Still further is the number of press roller sets and drive axes. For example, in some situations, especially involving longer meat pieces, it may be desirable to add additional press roller sets.

Importantly, as noted earlier, there is no rigid assignment or designation of meat cut to roller set configurations. On the contrary, a particular meat cut may be quite satisfactorily accommodated by very different roller set configurations. As is quite readily understood in the industry, the decision to use one configuration over another is determined to a large degree by that operator's experience and knowledge of what is most effective.

Therefore it is to be understood that the above description is intended in no way to limit the scope of protection of the claims and is representative of only a few of several possible embodiments of the present invention.

There has thus been shown and described an invention which accomplishes at least all of the stated objects.

I claim:

1. An automatic feed upper press roller apparatus for rotatably receiving and driving a first and second press roller means adapted for use on an automatic trimmer wherein a layer of material is trimmed from a meat product, the trimmer including a base frame; trimming means mounted on the base frame for trimming unwanted material from the meat product, feed means extending forwardly of the trimming means for transporting the meat product into trimming engagement with the trimming means, the automatic feed upper press roller apparatus comprising:

a conveyor frame; first and second press roller means having first and second drive shafts respectively mounted in said trimmer base frame parallel to each other and perpendicular to the axis of the meat product movement, said first shaft being mounted rearward of said second shaft and engagable with said automatic trimmer drive means;

drive means for engaging and moving the first and second press roller means and feed means;

means for mounting said conveyor frame on said automatic trimmer base frame; and tandem drive means connected to said first and second drive shafts such that said first and second drive shafts and associated press roller means are rotated in tandem and wherein said press roller means in cooperation with said feed means are operative to advance said meat product into trimming engagement with said trimming means and into pressure engagement with said press roller means such that the cooperative movement of said meat product by said press roller means, said feed means and said conveyor means is operative to transport said meat product in a substantially uniform direction through said automatic trimmer and to trim a layer of material from said meat product.

2. An automatic feed upper press roller apparatus for an automatic trimmer wherein a layer of material is trimmed from a meat product, the trimmer including a base frame; trimming means mounted on the base frame for trimming and slicing unwanted material from the meat product, feed means extending forwardly of the trimming means for transporting the meat product into trimming engagement with the trimming means, and drive means for engaging and moving the feed means, the automatic feed upper press roller apparatus comprising:

a conveyor frame;

means for mounting said conveyor frame on said automatic trimmer base frame;

first and second drive shafts mounted within said frame parallel to each other and perpendicular to the axis of meat product movement, said first shaft being mounted rearward of said second shaft and engagable with said automatic trimmer drive means;

first and second press roller means mounted on said first and second drive shafts, respectively; and tandem drive means connected to said first and second drive shafts such that said first and second drive shafts and associated press roller means are rotated in tandem and wherein said press roller means in cooperation with said feed means are operative to advance said meat product into trimming engagement with said trimming means and into pressure engagement with said press roller means such that the cooperative movement of said meat product by said press roller means, said feed means and said conveyor means is operative to transport said meat product in a substantially uniform direction through said automatic trimmer and to trim a layer of material from said meat product.

3. The invention of claim 2 wherein said first and second press roller means comprise a plurality of friction engagement wheels mounted in adjacent relation to each other on said first and second drive shafts.

4. The invention of claim 2 wherein said second press roller means comprises at least one slicing blade.

5. The invention of claim 3 wherein said plurality of friction engagement wheels comprise wheels having substantially equivalent diameters.

6. The invention of claim 3 wherein said friction engagement wheels on at least said first drive shaft comprises an hour glass shape having larger diameter at each end of said shaft and tapering to a narrower diameter in the center.

7. The invention of claim 6 wherein said friction engagement wheels on at least said first drive shaft further comprises a wheel having a diameter substantially equal to the wheels at the shaft end.

8. The invention of claim 4 wherein said second press roller further comprises at least one friction engagement wheel.

9. An automatic feed upper press roller apparatus for an automatic trimmer wherein a layer of material is trimmed from a meat product, the trimmer including a base frame; trimming means mounted on the base frame for trimming and slicing unwanted material from the meat product, feed means extending forwardly of the trimming means for transporting the meat product into trimming engagement with the trimming means, and drive means for engaging and moving the feed means, the automatic feed upper press roller apparatus comprising:

a conveyor frame;

means for mounting said conveyor frame on said automatic trimmer base frame;

first and second drive shafts mounted within said frame parallel to each other and perpendicular to the axis of meat product movement, said first shaft being mounted rearward of said second shaft and engagable with said automatic trimmer drive means;

slicing means mounted on second drive shaft;

press roller means mounted on said first drive shaft; and tandem drive means connected to said first and second drive shafts such that said first and second drive shafts and associated press roller means and slicing means are rotated in tandem and wherein said press roller means in cooperation with said feed means is operative to advance said meat product into slicing engagement with said slicing means and into trimming engagement with said trimming means and into pressure engagement with said press roller means such that the cooperative movement of said meat product by said press roller means, said feed means and said conveyor means is operative to transport said meat product in a substantially uniform direction through said automatic trimmer and to slice open a portion of said meat product and to trim a layer of material from said meat product.

10. The invention of claim 9 further comprising at least one press roller means mounted on said second drive shaft.

11. The invention of claim 10 wherein said first and second press roller means comprise a plurality of friction engagement wheels mounted in adjacent relation to each other on said first and second drive shafts.

12. The invention of claim 11 wherein said plurality of friction engagement wheels comprise wheels having substantially equivalent diameters.

13. The invention of claim 11 wherein said friction engagement wheels on at least said first drive shaft comprises an hour glass shape having larger diameter at each end of said shaft and tapering to a narrower diameter in the center.

14. The invention of claim 13 wherein said friction engagement wheels on at least said first drive shaft further comprises a wheel having a diameter substantially equal to the wheels at the shaft end.

15. The invention of claim 9 wherein said slicing means comprises a plurality of substantially equal diameter slicing blades mounted on said second drive shaft.

16. An automatic feed upper press roller apparatus for an automatic trimmer wherein a layer of material is trimmed from a meat product, the trimmer including a base frame; trimming means mounted on the base frame for trimming and slicing unwanted material from the meat product, feed means extending forwardly of the trimming means for transporting the meat product into trimming engagement with the trimming means, and drive means for engaging and moving the feed means, the automatic feed upper press roller apparatus comprising:

a conveyor frame;

means for mounting said conveyor frame on said automatic trimmer base frame;

a plurality of drive shafts mounted within said frame parallel to each other and perpendicular to the axis of meat product movement, said plurality of drive shafts being engageable with said automatic trimmer drive means;

a plurality of press roller means mounted on said plurality of drive shafts; and tandem drive means connected to said plurality of drive shafts such that said plurality of drive shafts and associated press roller means are rotated in tandem and wherein said press roller means in cooperation with said feed means are operative to advance said meat product into trimming engagement with said trimming means and into pressure engagement with said press roller means such that the cooperative movement of said meat product by said press roller means, said feed means and said conveyor means is operative to transport said meat product in a substantially uniform direction through said automatic trimmer and to trim a layer of material from said meat product.

17. A method of trimming an elongated, irregularly shaped meat product comprising:

providing automatic feed upper press roller apparatus for an automatic trimmer wherein a layer of material is trimmed from a meat product, said trimmer including trimming means for trimming and slicing unwanted material from said meat product, feed means extending forwardly of said trimming means for transporting the meat product into trimming engagement with said trimming means, feed roller means, and longitudinally spaced press roller means for cooperatively engaging said meat product and moving it past said trimming means;

placing a meat product to be trimmed on said feed means;

advancing said meat product on said feed means to said press roller means and said feed roller means;

advancing said meat product in a substantially uniform direction with said press roller means, said feed means and said feed roller means past said trimming means; and discharging said trimmed meat product from said trimmer.

18. The method of claim 17 wherein the step of providing a second friction means further comprises the step of providing at least one slicing means and wherein the step of trimming said meat product further includes the step of slicing an unwanted portion from said meat product.

19. The method of claim 17 wherein the step of advancing said meat product further includes the step of engaging said meat product at two longitudinally space apart positions by said press roller means.

* * * * *